Patented Aug. 25, 1931

1,820,645

UNITED STATES PATENT OFFICE

HARRY T. BENNETT, OF TULSA, OKLAHOMA, ASSIGNOR TO THE ATLANTIC REFINING COMPANY, A CORPORATION OF PENNSYLVANIA

PROCESS OF SEPARATING WAX FROM MINERAL OILS

No Drawing.   Application filed January 9, 1930. Serial No. 419,730.

This invention relates to a process for separating from mineral oils various waxy substances including the naturally occurring paraffin wax, amorphous wax, petrolatum or hydrocarbons which normally solidify or become semi-solid below a temperature of approximately 190° F.

An object of the invention is to lower the cold test of lubricating oils so that they will not solidify at comparatively low temperatures.

Another object of the invention is to effect the separation of wax-like substances from the oil expeditiously and inexpensively.

Commercial paraffin is obtained ordinarily from the so-called paraffin or wax distillates by the well known process of pressing a suitably chilled distillate and sweating and filtering the crude wax so obtained. So-called paraffin slop, heavier lubricating distillates and the lubricating residues or cylinder stocks cannot be treated in the manner just mentioned for the recovery of paraffin. This is probably due to the presence in these oils of heavy amorphous material such as petrolatum. The paraffin slop and heavier distillates are often subjected to a further distillation or rerunning in which cracking occurs and a fraction similar to paraffin distillate is obtained, but this process results in the decomposition of the higher boiling and valuable lubricating oil fractions.

More recent methods which have been proposed accomplish the removal of the wax from the oil by chilling and precipitating it from a suitable solvent, with or without the use of an insoluble solid filter aid. The precipitated wax, with or without a filter aid, is then settled, filtered or centrifuged from the solution of oil.

These methods, while making it possible to separate the amorphous and other wax from the heavier distillates and residues, are very expensive due to the use of expensive solvents and precipitants and the great care necessary to reduce their loss as much as possible, the large amount of filter aids necessary and the difficulties of handling, separating and recovering the solvents, precipitants and filter aids. Some of these methods are also dangerous, due to the poisonous character of the volatile solvent used.

In the present invention many of the difficulties mentioned in the prior art are eliminated and the process rendered more simple and effective by employing a comparatively inexpensive solvent, such as petroleum naphtha, and an organic filter aid, such as naphthalene, or diphenyl, which is soluble in the solvent and oil solution at ordinary temperatures, but is partially or completely precipitated in crystalline form from the oil solution on chilling to various temperatures at or below the melting point of amorphous or other paraffin wax contained in the mineral oil. Said organic filter aid has physical characteristics that render it recoverable from the separated wax or petrolatum, either alone or with the solvent used, by the simple means of distillation with or without the use of steam and proper dephlegmating and condensing equipment.

In carrying out this new process, the mineral oil which is to be separated from the wax or petrolatum is reduced to a suitably low viscosity by thinning with, or dissolving in, a suitable organic solvent or diluent such as petroleum naphtha in which has previously been dissolved a crystalline organic compound such as naphthalene or diphenyl. The mixture of wax carrying oil, solvent and dissolved filter aid is then chilled slowly or rapidly, depending on the nature of the oil and wax being separated and on the means used for separating said oil and wax, to a temperature lower than the pour point desired in the finished oil, this temperature being usually lower than 60° F. The precipitated wax and filter aid are then separated from the oil solution by settling, filtering, centrifuging or other mechanical means of separating solids from liquids. If the wax content of the oil is high, the oil solution, after separation from the precipitated wax and crystalline organic filter aid precipitated during the first chilling, may be again chilled one or more time to successively lower temperatures and the precipitated wax and filter aid separated after each chilling, or all the precipitated wax and filter aid may be separated from the oil solution after the final chilling.

The ratio of solvent to the original oil and the per cent of filter aid necessary depends on the nature of the oil and wax or petrolatum to be separated and the degree of chilling to be used as well as the cold test desired on the finished oil. For example, the ratio of solvent to the filter aid may be 60% to 95% solvent and 40% to 5% filter aid.

As an example of the operation of the process, a petroleum naphtha was saturated with naphthalene at 80° F., or thereabout. At this temperature approximately one and one-fourth pounds of naphthalene were soluble in one gallon of petroleum naphtha.

A heavy petroleum lubricating distillate containing a high percentage of amorphous or crystalline wax and having a cold test of approximately 100° F. was dissolved in this solution of naphthalene in naphtha at about the rate of one part of distillate to three parts of naphthalene solution. This solution was then chilled to 50° F. and the precipitated naphthalene and wax were filtered out. At this temperature only about three-fourths of a pound of naphthalene is soluble in a gallon of naphtha, or in chilling from 80° F. to 50° F. about one-half pound of naphthalene is precipitated from each gallon of naphtha. The filtered naphtha solution of the naphthalene and distillate was then chilled further to —20° F. and the precipitated naphthalene and wax were again filtered from the naphtha solution of distillate. At this comparatively low temperature only a comparatively small amount of naphthalene is soluble in the solution and practically all of the remaining naphthalene is precipitated out along with the wax or petrolatum.

The precipitated naphthalene and wax or petrolatum were thus separated from the naphtha solution of distillate.

The naphtha and naphthalene were then separated from the distillate and from the wax or petrolatum by steam and fire distillation. It will be understood that the naphtha solution passing through the filter will contain a very small quantity of naphthalene, and that some naphtha will be left in the mixture of wax and naphthalene in the filter. The distilling operations just described remove these small quantities as well as the main bodies of naphtha and naphthalene. No attempt was made to collect the naphtha and naphthalene separately since they were to be used again, as they were, in solution. The use of a large amount of steam facilitates the separation of the naphthalene from the oil or wax. In this manner the separated wax or petrolatum and the separated oil or distillate having a cold test of zero degrees Fahrenheit were recovered free from naphtha or naphthalene and this solvent and organic filter aid were recovered in solution ready for reuse after separating the condensed water from the steam distillation.

Although the present invention has been described in connection with the details of a specific example thereof, it is not intended that such details shall be regarded as limitations upon the scope of the invention. Petroleum naphtha is named as a suitable solvent to be used and naphthalene as a suitable soluble organic filter aid simply because they are comparatively inexpensive and readily obtainable and have served the purpose of this invention, but I do not intend to limit myself to this single solvent which may be replaced by various alcohols, ethers, acetones, ketones, benzene, toluene and similar compounds. The naphthalene may be replaced by, or advantageously mixed with, diphenyl or other similar crystalline organic compounds soluble in said solvents, or mixtures of the said solvents, and in cases of the manufacture of special wax products or special oils of extremely low cold tests the use of these more expensive solvents and soluble filter aids may be justified.

Neither do I intend to limit myself to any particular petroleum distillate or residue in the application of this invention since by variations in the amounts and kinds of solvents and soluble filter aids and also by variations in the degree and rates of chilling a wide variety of distillates and residues may be treated so as to yield an even wider range of waxes and petroleum lubricants. The example of an actual operation carried on in the application of this invention is not limited thereto, except in so far as included in the following claims.

I claim:

1. The process of separating naturally occurring waxy substances from a mineral oil, which comprises dissolving said mineral oil in a solution of organic solvent and diphenyl, and chilling the resultant solution to a temperature low enough to precipitate some of said waxy substances and diphenyl.

2. In a process for the removal of waxy substances from mineral oil the step which consists in treating the oil with a mixture containing an organic solvent and diphenyl.

3. In the removal of waxy substances from mineral oil, the step which consists in conditioning the oil with a mixture containing petroleum naphtha and diphenyl.

4. In the removal of waxy substances from mineral oil the step which consists in contacting the oil with a mixture of petroleum naptha and a crystalline organic material containing diphenyl in substantial amount.

In testimony that I claim the foregoing I hereunto affix my signature.

HARRY T. BENNETT.